US008657504B2
US 8,657,504 B2
Feb. 25, 2014

(12) United States Patent
Wang et al.

(54) OPTICAL FIBER CONNECTION DEVICE HAVING A ROTATING AND FIXING MECHANISM AND A POSITIONING MEMBER

(75) Inventors: Buck Wang, Shanghai (CN); Liming Wang, Shanghai (CN)

(73) Assignee: Tyco Electronics (Shanghai) Co. Ltd., Shanghai (CN)

(*) Notice: Subject to any disclaimer, the term of this patent is extended or adjusted under 35 U.S.C. 154(b) by 491 days.

(21) Appl. No.: 12/925,304

(22) Filed: Oct. 19, 2010

(65) Prior Publication Data
US 2011/0268391 A1    Nov. 3, 2011

(30) Foreign Application Priority Data
Oct. 19, 2009   (CN) .......................... 2009 1 0197541

(51) Int. Cl.
G02B 6/00     (2006.01)
G02B 6/36     (2006.01)
G02B 6/38     (2006.01)
G02B 6/42     (2006.01)
B82Y 20/00    (2011.01)

(52) U.S. Cl.
CPC ............... G02B 6/00 (2013.01); G02B 6/3897 (2013.01); *G02B 6/3825* (2013.01); *G02B 6/4292* (2013.01); *G02B 6/0008* (2013.01); *B82Y 20/00* (2013.01)
USPC ........................................... 385/53; 385/147

(58) Field of Classification Search
CPC .................................. G02B 6/00; B82Y 20/00
USPC .............. 385/53, 54, 55, 88, 89, 147, 86, 137
See application file for complete search history.

(56) References Cited

U.S. PATENT DOCUMENTS 3,588,219 A *  6/1971  Lusted .......................... 359/371
5,687,268 A    11/1997  Stephenson et al.
(Continued)

FOREIGN PATENT DOCUMENTS

| GB | 2 313 207 A | 11/1997 |
| JP | 2004 045478 A | 2/2004 |
| JP | 2006 145597 A | 6/2006 |
| WO | WO 2004/034117 A2 | 4/2004 |
| WO | WO 2007/039585 A1 | 4/2007 |
| WO | WO 2009/040568 A1 | 4/2009 |

OTHER PUBLICATIONS

European Search Report issued by the European Patent Ofice, Rijswijk, Netherlands, dated Mar. 4, 2011, for related European Patent Application No. EP 10187831.2; 7 pages.

*Primary Examiner* — Akm Enayet Ullah
(74) *Attorney, Agent, or Firm* — Faegre Baker Daniels LLP

(57) ABSTRACT

The present invention discloses an optical fiber connection device, comprising: a base plate; at least one adapter for receiving optical fiber connectors; a rotating and fixing mechanism being provided on the base plate and being connected with the adapters, the rotating and fixing mechanism comprising: a fixing portion for fixedly connecting with the adapter; and a rotating portion being rotatably connected to the base plate, through which the mechanism can rotate between an operation position and a receiving/releasing position; and a positioning member for stably holding the rotating and fixing mechanism in the operation position or the receiving/releasing position, and limiting the rotation angle of the mechanism and that of the adapter within a predetermined angle range.

6 Claims, 4 Drawing Sheets

(56) References Cited

U.S. PATENT DOCUMENTS

| | | | |
|---|---|---|---|
| 5,887,100 A * | 3/1999 | Robertson | 385/76 |
| 6,424,821 B1 * | 7/2002 | Komai et al. | 455/66.1 |
| 7,591,089 B2 * | 9/2009 | Keany | 37/408 |
| 7,802,926 B2 * | 9/2010 | Leeman et al. | 385/86 |
| 2002/0031312 A1 * | 3/2002 | Iwamoto | 385/88 |
| 2008/0016728 A1 * | 1/2008 | Keany | 37/347 |
| 2009/0313873 A1 * | 12/2009 | Roth | 42/72 |

* cited by examiner

OPTICAL FIBER CONNECTION DEVICE HAVING A ROTATING AND FIXING MECHANISM AND A POSITIONING MEMBER

CROSS-REFERENCE TO RELATED APPLICATION

This application claims the benefit of Chinese Patent Application No. 200910197541.7 filed on Oct. 19, 2009 in the State Intellectual Property Office of China, the whole disclosure of which is incorporated herein by reference.

BACKGROUND OF THE INVENTION

1. Field of the Invention

The present invention relates to an electrical adapter technology, particularly, relates to an optical fiber connection device applied in an optical fiber junction box.

2. Description of the Related Art

A new optical fiber connection device for making and facilitating optical fiber connections, especially drop cable connections from a telecommunications optical network to subscribers, sometimes referred to a "Fiber To The Home" (FTTH). The optical fiber connection device facilitates physical connection of optical fiber cables in an optical fiber transmission network. Accordingly, the optical fiber connection device should be adapted for close-packed optical fiber cable connectors applied in the optical fiber transmission network.

Furthermore, in the optical fiber transmission network, terminals of fiber cables are connected with adapters in the optical fiber junction box by optical fiber connectors, such as SC connectors. In the optical fiber junction box, the structure for assembling the adapters, such as the standard SC connector, needs to exhibit the following performances.

1. A good operability, that is, the optical fiber connector can be easily and smoothly inserted into and pulled out of the adapter;

2. Compact configuration, that is, more adapters can be received in the optical fiber junction box without increasing the size of it;

3. An excellent compatibility, that is, it can be adapted for different standard adapters.

A conventional structure for the adapter includes a rotatable member on which the adapter is assembled. At the time of connecting the optical fiber connectors, the rotatable member is rotated so that the adapter mounted on the rotatable member becomes higher than other adapters. In this way, the optical fiber connectors can be easily pulled out of the adapter. However, the conventional structure neither can stably secure the adapter thereon nor can prevent optical fibers of the junction box from damage due to rotating the rotatable member by an unsuitable angle. For example, a Chinese patent application No. 200680036761 discloses an optical fiber connection device. As shown in FIGS. III-2, III-3 of the Chinese patent application, the rotation of the rotatable member can not be controlled, the optical fibers (such as the optical fibers 320 shown in FIG. III-3) of the junction box, therefore, may be damaged upon the rotatable member being rotated by an unduly large angle during operation. Furthermore, to secure the adapter, a holder 313 must be provided on a base plate 301 at a position corresponding to the adapter. In addition, the optical fiber connector must be formed with a flat feature 113 for fitting with the holder 313 so as to secure the adapter. That is, in order that the rotatable member can be held in a non-operation state, the Chinese patent application adopts a special feature (i.e. the flat feature) formed on the optical fiber connector to hold the rotatable member, but the special feature can not be adapted for the standard SC connector.

SUMMARY OF THE INVENTION

The present invention has been made to overcome or alleviate at least one aspect of the above mentioned disadvantages. Accordingly, it is an object of the present invention to provide an optical fiber connection device that can properly limit a rotation angle of a rotating portion of a rotating and fixing mechanism for an adapter. Accordingly, an operator can easily insert or pull out the optical fibers, and the case that the optical fiber at the back of the optical fiber connection device may be damaged because of rotating the rotatable member by an unduly large angle in the prior art can be effectively prevented.

According to another object of the present invention, there is provided an optical fiber connection device that may effectively secure an adapter thereon.

According to yet another object of the present invention, there is provided an optical fiber connection device that may be adapted for all standard types of SC connectors.

According to an aspect of the present invention, there is provided an optical fiber connection device comprising: a base plate; at least one adapter for receiving optical fiber connectors; a rotating and fixing mechanism being provided on the base plate and being connected with the adapters; and a positioning member for holding the rotating and fixing mechanism. The rotating and fixing mechanism comprising: a fixing portion for fixedly connecting with the adapter; and a rotating portion being rotatably connected to the base plate, through which the rotating and fixing mechanism can shift between an operation position and a receiving/releasing position. The positioning member is used to stably hold the rotating and fixing mechanism in the operation position or the receiving/releasing position, and limit the rotation angle of the mechanism and that of the adapter within a predetermined angle range.

According to an exemplary embodiment, the adapter has leaf springs, and the fixing portion comprises a case for fitting with the adapter and recesses being formed in the case. When the adapter is fitted in the case, the leaf springs of the adapter abut against walls of the recesses so as to secure the adapter in the case of the rotating and fixing mechanism. The structure for rotating the adapter may comprise a fixation frame being formed on the base plate and having a shaft hole therein. The rotating portion may be configured to be a rotation shaft. The adapter may be rotatably connected to the base plate by fitting the rotation shaft in the hole of the fixation frame.

Preferably, the positioning member comprising: a protrusion being formed on a sidewall of the case; an arc groove being formed on the other sidewall opposite to the one sidewall of the case; and two supporters being located at both outermost sides of the base plate, one of the two supporters having a protrusion thereon, the other of the two supporters having an arc groove thereon. The protrusion of a case or a supporter is fitted with the adjacent arc groove of an adjacent case or an adjacent supporter. When the protrusion reaches a lower end of the arc groove, the rotating and fixing mechanism is held in the operation position; when the protrusion reaches an upper end of the arc groove, the rotating and fixing mechanism is held in the receiving/releasing position.

More preferably, the positioning member further comprising: a hook being formed on the base plate; and an opening being formed in the case. When the rotating portion rotates to the operation position, the hook is connected with the opening in a snap fitting manner so as to hold the rotating and fixing mechanism in the operation position.

Furthermore, the recesses are formed in a top wall and a bottom wall of the case, respectively.

In addition, the optical fiber connection device may comprise a plurality of adapters being arranged on the base plate in a row.

Advantageously, the device comprises a plurality of adapters being arranged on the base plate in a row.

In the present invention, the optical fiber connection device is formed with the positioning member, i.e. protrusions and arc grooves fitted with the protrusions are provided on/in the sidewalls of the cases and supporters of the base plate, the rotation angle of the rotating portion is suitably limited within the predetermined angle range and the rotating portion is held in the receiving/releasing position within the predetermined angle range. Thereby, an operator can easily insert or pull out the optical fibers, and the case that the optical fiber at the back of the optical fiber connection device may be damaged because of rotating the rotatable member by an unduly large angle in the prior art can be effectively prevented. Meanwhile, the positioning member according to the present invention can also stably hold the rotating portion in the operation position. In addition, the optical fiber connection device according to the present invention further comprises a portion for effectively fixing the adapter in the rotating and fixing mechanism. Furthermore, the optical fiber connection device according to the present invention may be compatible for all standard types of SC connectors.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF PREFERRED EMBODIMENTS OF THE INVENTION

Figure 1:
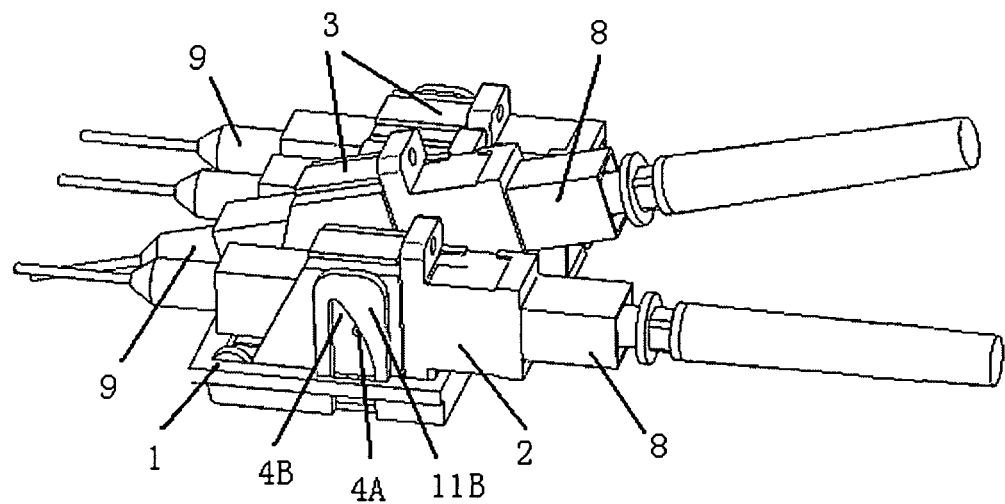
FIG. 1 is a structural schematic view of an optical fiber connection device according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Referring to FIGS. 1-7, the present invention provided an optical fiber connection device.

Figure 2:
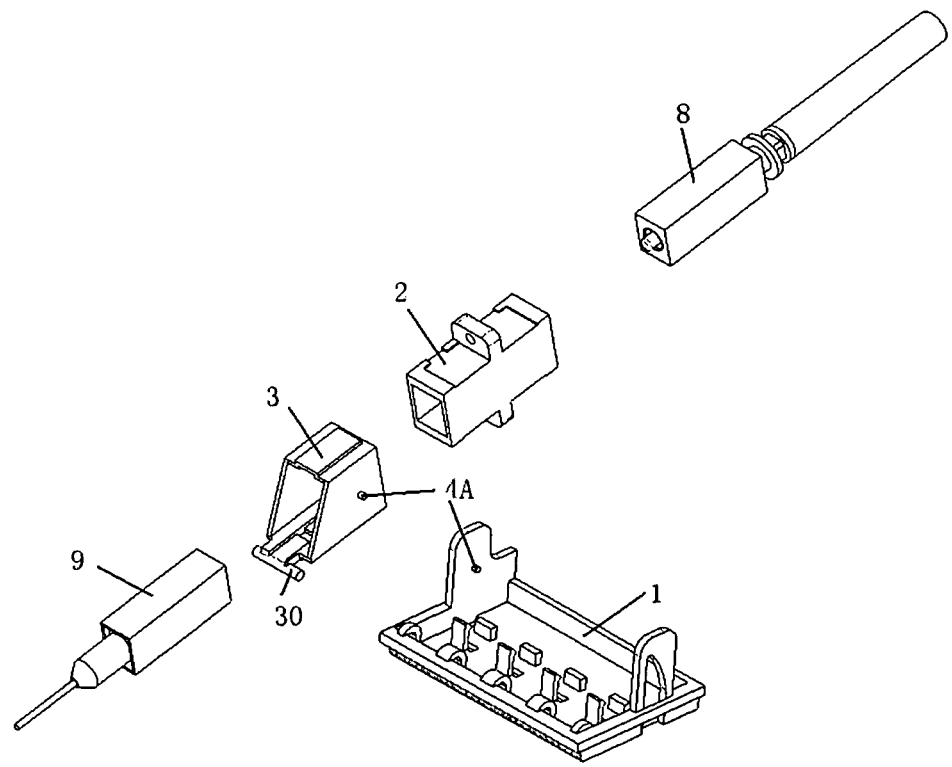
FIG. 2 is an exploded structural schematic view of the optical fiber connection device shown in FIG. 1.
Figure 3:
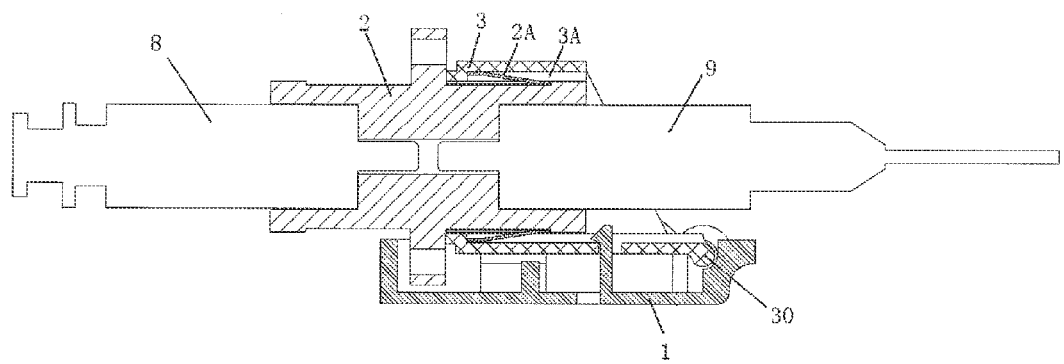
FIG. 3 is a cross-section view of the optical fiber connection device shown in FIG. 1.

Particularly, FIG. 1 is a structural schematic view of an optical fiber connection device according to an exemplary embodiment of the present invention, in which the optical fiber connection device connects an optical fiber connector 8 with an optical fiber connector 9. FIG. 2 is an exploded structural schematic view of the optical fiber connection device shown in FIG. 1, in which only one group of optical fiber connection configuration is illustrated for easy understanding. FIG. 3 is a cross-section view of the optical fiber connection device shown in FIG. 1, simply illustrating the inner connection configuration of the optical fiber connection device.

In the optical fiber connection device of the present invention, as shown in FIGS. 1-3, the optical fiber connection device comprises a base plate 1 and a plurality of adapters 2. The adapters 2 are adapted for receiving optical fiber connectors 8, 9 therein. Referring to FIG. 1, all adapters are arranged on the base plate 1 to be in parallel with each other. The connectors 8, 9 (such as SC connectors) of optical cables are inserted into the adapter 2 from both sides thereof, respectively, to accomplish the connection of fibers. The present invention mainly relates to the insertion (or receipt), fixation and extraction (or release) of the connector 8 in the optical fiber connection device. In the present invention, an operation position refers to a normal position where the adapter 2 is held on the base plate 1 during the optical fiber connection device is in a normal operation state; a receiving/releasing position refers to a position where the adapter 2 is held on the base plate 1 during the optical fiber connection device is in a non-operation state (i.e. during inserting or releasing the optical fiber connectors). As shown in FIG. 1, one of the adapters 2, which is rotated upwards relative to the base plate 1 at a certain angle, is in the receiving/releasing position at which the optical fiber connector 8 can be easily inserted or pulled out.

In the present invention, the optical fiber connection device fixes the adapter 2 and shifts the adapter 2 between the operation position and the receiving/releasing position by use of a rotating and fixing mechanism for the adapter. The rotating and fixing mechanism is provided on the base plate 1 and is fitted with the adapter 2. In an exemplary embodiment, the rotating and fixing mechanism comprises a fixing portion for fixedly connecting with the adapter 2 and a rotating portion being rotatably connected to the base plate 1. The fixing portion of the mechanism accomplishes the fixation of the adapter 2 on the optical fiber connection device, and the rotating portion of the mechanism accomplishes the shift of the adapter 2 between the operation position and the receiving/releasing position. The shift of the rotating and fixing mechanism between the operation position and the receiving/releasing position is carried out by rotation of the rotating portion relative to the base plate 1, that is, the rotating portion of the mechanism is mainly used to rotate the adapter 2 to the receiving/releasing position where the adapter 2 can be easily inserted or pulled out. In an exemplary embodiment of the present invention, the optical fiber connection device further comprises a positioning member for stably holding the rotating and fixing mechanism in the operation position or the receiving/releasing position, and limiting the rotation angle of the mechanism and thus that of the adapter 2 within a predetermined angle range. Please note that the predetermined angle range can be adjusted during design according to actual requirements of the rotation angle of the adapter 2.

Generally, the predetermined rotation angle range is designed not to damage the fiber (the fiber of the connector 9 shown in FIG. 1) at the other side of the adapter 2 when the adapter 2 is rotated to the receiving/releasing position. The rotating portion of the mechanism drives the adapter 2 to shift between the operation position and the receiving/releasing position. The positioning member holds the adapter 2 in the operation position or the receiving/releasing position.

Figure 4:
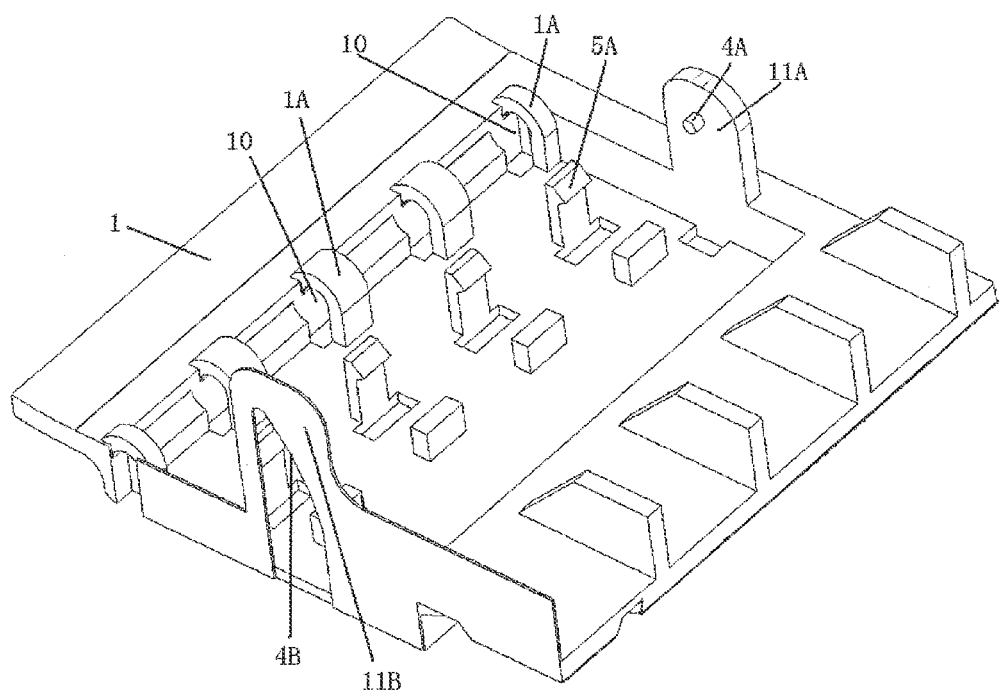
FIG. 4 is an enlarged structural schematic view of a base plate of the optical fiber connection device according to the exemplary embodiment of the present invention.
Figure 5:
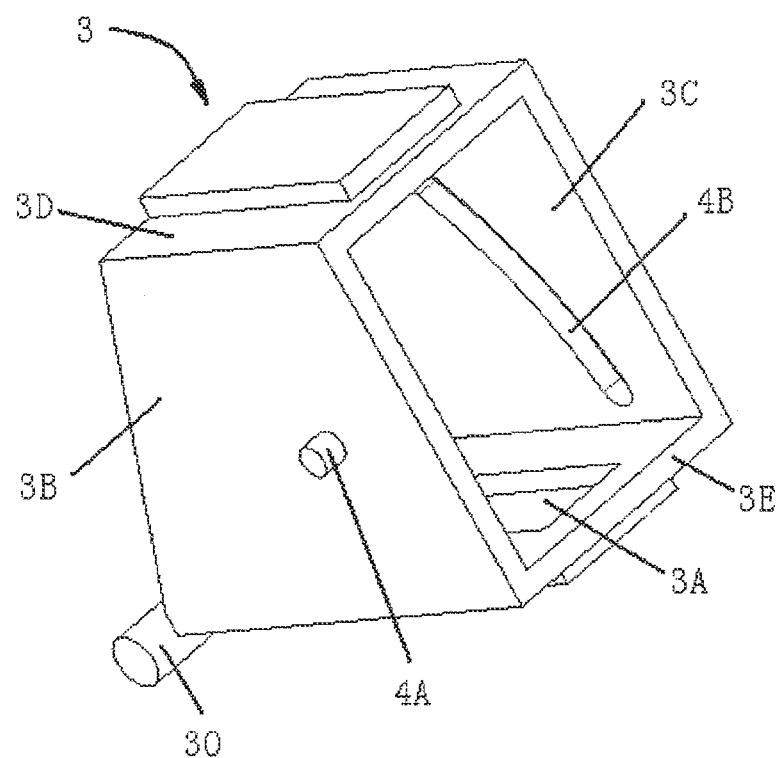
FIG. 5 is an enlarged structural schematic view of a single case of the optical fiber connection device according to the exemplary embodiment of the present invention.
Figure 6:
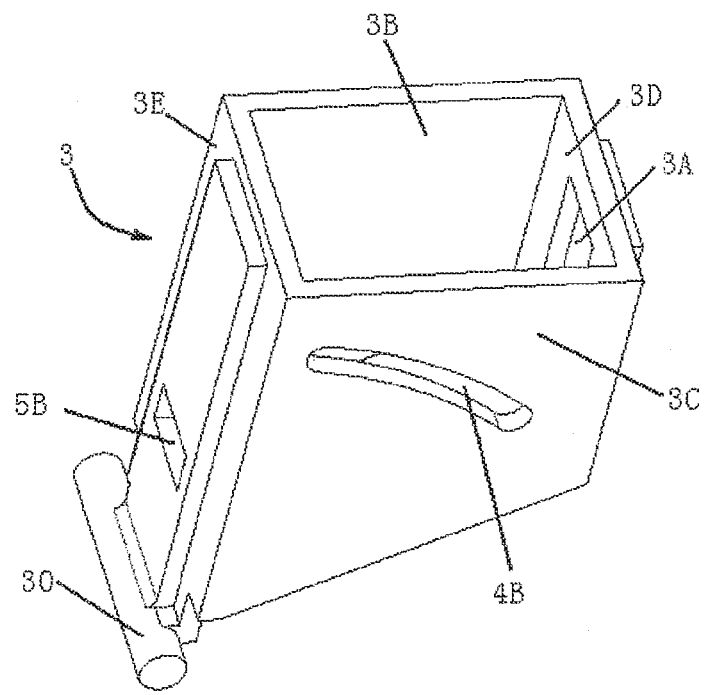
FIG. 6 is another enlarged structural schematic view of a single case of the optical fiber connection device according to the exemplary embodiment of the present invention.
Figure 7:
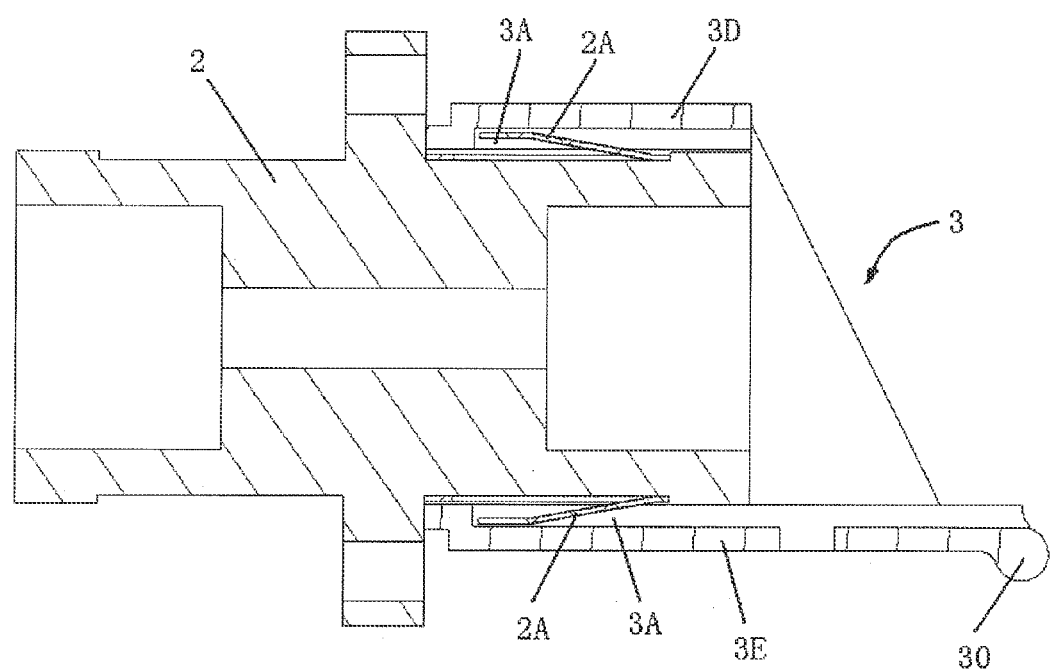
FIG. 7 is another cross-section view of the optical fiber connection device according to the exemplary embodiment of the present invention.

FIG. 4 is an enlarged structural schematic view of a base plate of the optical fiber connection device according to the exemplary embodiment of the present invention, in which the base plate is formed with a part of structure of the rotating and fixing mechanism thereon. FIG. 5 is an enlarged structural schematic view of a single case of the optical fiber connection device according to the exemplary embodiment of the present invention. FIG. 6 is another enlarged structural schematic view of a single case of the optical fiber connection device according to the exemplary embodiment of the present invention. FIG. 7 is another cross-section view of the optical fiber connection device according to the exemplary embodiment of the present invention, illustrating the fitting manner of the adapter and a case.

Referring to FIGS. 5-7, in an exemplary embodiment of the present invention, the adapter 2 has leaf springs 2A. The fixing portion of the mechanism comprises: a case 3 for fitting with the adapter 2; and recesses 3A being formed in the case 3. When the adapter 2 is fitted in the case 3, the leaf springs 2A of the adapter 2 are provided in the recesses and abut against walls of the recesses 3A so as to fix the adapter 2 in the case 3 of the rotating and fixing mechanism. In this way, because the case 3 is connected to the base plate 1, the adapter 2 is also effectively connected to the base plate 1. As shown in FIGS. 1-2, each of the adapters 2 is housed in one case 3, all the cases 3 for the adapters 2 are also arranged on the base plate 1 to be in parallel with each other. In an exemplary embodiment of the present invention, referring to FIGS. 4-7, the recesses 3A are formed in a top wall 3D and a bottom wall 3E of the case 3, respectively.

In an exemplary embodiment of the present invention, as shown in FIGS. 4-6, a plurality of fixation frames 1A are formed on the base plate 1 and each of the fixation frames 1A has a shaft hole 10. The rotating portion of the mechanism is configured to be a rotation shaft 30, the mechanism may be rotatably connected to the base plate 1 by fitting the rotation shaft 30 in the holes 10 of the corresponding fixation frames, that is, the case 3 may be rotatably connected to the base plate 1 by fitting the rotation shaft 30 in the hole 10. In this way, the adapter 2 may be rotated with the rotation of the case 3 about the rotation shaft 30 to accomplish the shift of the adapter 2 between the operation position and the receiving/releasing position.

According to the present invention, the positioning member holds the rotating and fixing mechanism in the operation position or the receiving/releasing position, and limits the rotation angle of the mechanism and thus that of the adapter within the predetermined angle range. In an exemplary of the present invention, as shown in FIGS. 4-6, the positioning member comprises a protrusion 4A being formed on one sidewall of the case 3, an arc groove 4B being formed on the other sidewall opposite to the one sidewall of the case 3, and two supporters 11A, 11B being located at both outermost sides of the base plate 1. One of the two supporters 11A, 11B has a protrusion 4A thereon, the other of the two supporters 11A, 11B has an arc groove 4B therein. The protrusion 4A of the case 3 or of the supporter 11A is fitted with the adjacent arc groove 4B of the case 3 or of the supporter 11B. When the protrusion 4A reaches a lower end of the arc groove 4B, the rotating and fixing mechanism is held in the operation position; when the protrusion 4A reaches an upper end of the arc groove 4B, the rotating and fixing mechanism is held in the receiving/releasing position. In this exemplary embodiment, the positioning member is formed on two adjacent cases 3, or on one case 3 adjacent to one supporter and the adjacent one of the two supporters 11A, 11B. According to this exemplary embodiment of the present invention, referring to FIGS. 4-5, for example, one of the positioning members comprises the protrusion 4A being formed on one sidewall 3B of one case 3, and the arc groove 4B being formed on one sidewall 3C of another adjacent case 3 opposite to the one sidewall 3B. The protrusion 4A of the case 3 is located in the arc groove 4B of another adjacent case 3. When the rotating portion is rotated to the receiving/releasing position, the protrusion 4A abuts against the uppermost end of the arc groove 4B so as to hold the rotating and fixing mechanism in the receiving/releasing position (as shown in FIG. 1, the position in which one adapter 2 is located after being rotated by a predetermined angle). Meanwhile, because the protrusion 4A abuts against the uppermost end of the arc groove 4B when the case 3 is rotated to the receiving/releasing position, rotation angle of the case 3 is limited within the predetermined angle range, and therefore the case 3 is held in the receiving/releasing position. Thereby, it can effectively prevent the risk of damaging the optical fiber at the back of the optical fiber connection device due to rotating the adapter 2 by an unduly large angle. Preferably, the arc groove 4B may pass through the sidewall 3C of the case 3. In an exemplary embodiment, the length of the arc groove 4B may be designed to have a margin so that the protrusion 4A does not abut against the lowermost end of the groove 4B when the rotating and fixing mechanism rotates to the operation position. In another exemplary embodiment, the arc groove 4B may be designed to have a length so that the protrusion 4A just abuts against the lowermost end of the groove 4B when the rotating and fixing mechanism rotates to the operation position; in this case, the arc groove 4B has the shortest length. According to the present invention, as shown FIG. 4, in order to hold two cases 3 at both outermost sides of the base plate 1, the positioning member further comprises two supporters 11A, 11B being located at the two sides of the hole 10 of the base plate 1. Please refer to FIG. 4, one supporter 11A has a protrusion 4A thereon, and the protrusion 4A of the one supporter 11A is located in an arc groove 4B formed in a case 3 adjacent to the one supporter 11A. Another supporter 11B has a protrusion 4B thereon, and the protrusion 4B of the another supporter 11B is located in an arc groove 4B formed in a case 3 adjacent to the other supporter 11B. In this way, the adapters 2 at both sides of the base plate 1 can be suitably held in the receiving/releasing position.

In the above positioning member, the rotation angle of the case 3 is limited within the predetermined range by fitting the protrusions 4A in the arc grooves 4B on the sidewalls 33B, 3C of the cases 3, for example, the adapter 2 in the case 3 is held in the receiving/releasing position. Thereby, an operator can easily insert or pull out the optical fibers by use of only one hand, and the technical problem that the optical fiber at the back of the optical fiber connection device may be damaged because of rotating the case by an unduly large angle in the prior art can be effectively prevented. In an exemplary embodiment of the present invention, any adjacent cases 3 are closely arranged each other on the base plate 1, reducing the space between the adjacent cases 3 as can as possible. Therefore, the optical fiber connection device according to this exemplary has compact configuration so that more adapters can be received in the optical fiber junction box without increasing the size of it.

In the above exemplary embodiments, the rotation angle of the rotating and fixing mechanism is suitably limited by the positioning member, and the rotation range of the adapter is limited within the suitable predetermined range so as to prevent the optical fiber at the back of the optical fiber connection device from damage due to rotating the case by an unduly large angle.

In addition, in the present invention, the positioning member further comprises features for effectively holding the cases 3 in the operation position. In an exemplary embodiment of the present invention, as shown in FIG. 4 and FIG. 6, the positioning member further comprises a hook 5A being formed on the base plate 1 and an opening 5B being formed in the case 3. When the rotating portion rotates to the operation position, the hook 5A is connected with the opening 5B in a snap fitting manner so as to hold the rotating and fixing mechanism in the operation position, as shown in FIG. 3.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

The invention claimed is:

1. An optical fiber connection device, comprising:
   a base plate;
   at least one adapter for receiving optical fiber connectors;
   a rotating and fixing mechanism being provided on the base plate and being connected with the adapters, the rotating and fixing mechanism comprising:
   a fixing portion for fixedly connecting with the adapter; and
   a rotating portion being rotatably connected to the base plate, through which the mechanism can shift between an operation position and a receiving/releasing position; and
   a positioning member for stably holding the rotating and fixing mechanism in the operation position or the receiving/releasing position, and limiting the rotation angle of the mechanism and that of the adapter within a predetermined angle range, wherein the positioning member comprises:
   a protrusion being formed on one sidewall of the case;
   an arc groove being formed on the other sidewall opposite to the one sidewall of the case; and
   two supporters being located at both outermost sides of the base plate, one of the two supporters having a protrusion thereon, the other of the two supporters having an arc groove therein, the protrusion of the case or the supporter is fitted with the adjacent arc groove of the adjacent case or the adjacent supporter, when the protrusion reaches a lower end of the arc groove, the rotating and fixing mechanism is held in the operation position, and when the protrusion reaches an upper end of the arc groove, the rotating and fixing mechanism is held in the receiving/releasing position.

2. The optical fiber connection device according to claim 1, the adapter having leaf springs, and the fixing portion comprising:
   a case for fitting with the adapter; and
   recesses being formed in the case,
   wherein when the adapter is fitted in the case, the leaf springs of the adapter abut against walls of the recesses so as to fix the adapter in the case of the rotating and fixing mechanism.

3. The optical fiber connection device according to claim 2, wherein a fixation frame being formed on the base plate and having a shaft hole; and
   the rotating portion being configured to be a rotation shaft, the adapter being rotatably connected to the base plate by fitting the rotation shaft in the hole.

4. The optical fiber connection device according to claim 1, wherein the positioning member further comprising:
   a hook being formed on the base plate; and
   an opening being formed in the case,
   wherein when the rotating portion rotates to the operation position, the hook is connected with the opening in a snap fitting manner so as to hold the rotating and fixing mechanism in the operation position.

5. The optical fiber connection device according to claim 2, wherein the recesses are formed in a top wall and a bottom wall of the case, respectively.

6. The optical fiber connection device according to claim 1, wherein the device comprises a plurality of adapters being arranged on the base plate in a row.

* * * * *